United States Patent [19]

Avida

[11] Patent Number: 6,116,707
[45] Date of Patent: Sep. 12, 2000

[54] ROBOTIC PLOTTER SYSTEM

[75] Inventor: Dan Avida, Belmont, Calif.

[73] Assignee: Electronics for Imaging, Inc., Foster City, Calif.

[21] Appl. No.: 08/993,819

[22] Filed: Dec. 18, 1997

[51] Int. Cl.⁷ .................................................. G01D 15/16
[52] U.S. Cl. ........................... 346/139 R; 347/5; 347/109
[58] Field of Search .................................. 347/5, 19, 109, 347/37; 346/139 R, 29, 46, 49, 143; 400/88; 358/473; 395/80

[56] References Cited

U.S. PATENT DOCUMENTS

| | | | |
|---|---|---|---|
| 4,615,040 | 9/1986 | Mojoli et al. | 375/40 |
| 5,164,841 | 11/1992 | Takahashi | 358/341 |
| 5,446,559 | 8/1995 | Birk | 347/109 |
| 5,686,938 | 11/1997 | Batkhan | 345/145 |

*Primary Examiner*—John Barlow
*Assistant Examiner*—An H. Do
*Attorney, Agent, or Firm*—Michael A. Glenn; Donald M. Hendricks

[57] ABSTRACT

A robotic plotting system 10 is provided, in which a robotic plotter 18 having a printhead 18 is placed on a substantially flat horizontal surface 23, upon a recording medium 22, and is directed across the medium 22 by ranging signals 16 transmitted to the printhead 18 from the periphery of the recording medium 22. In one embodiment, the robotic printhead 18 includes a motorized drive mechanism 26, 28 that propels it across the surface of the recording medium 22 in a controlled manner, for example using microwave control signals 16. Thus, a user can place a piece of paper 22 of any size on a flat surface 23 such as a table or floor, and the printhead 18 is propelled across the surface 23 and is directed by signals 16 beamed between the printhead 18 and a control mechanism 14. In this manner, a large-surface-area plotting system 10 is provided in the form of a small hand-held device.

20 Claims, 8 Drawing Sheets

ROBOTIC PLOTTER SYSTEM

FIELD OF THE INVENTION

The invention relates to the field of electronic plotting systems. More particularly, the invention relates to a robotic plotting and printhead system for wireless printing onto a recording medium.

BACKGROUND OF THE INVENTION

Plotting systems are used for a variety of output applications. These systems typically include a plotting surface onto which a plotting medium is located, a plotting pen residing on a printhead, and associated electronics for determining the interaction between the printhead and a fixed framework or grid structure. A digital data signal is typically derived to guide the position of the plotter printhead relative to the grid structure.

E. Speicher, Multiple Movement Marking Machine, U.S. Pat. No. 4,557,191 (Dec. 10, 1985) discloses a marking device for printing identification marks, which is "mounted for vertical and pivotal movement on the end of an upper arm. The upper arm is movable along a first axis in a horizontal plane to extend and retract the marking head assembly into and out of marking position.

The upper arm is movable relative to the carriage, and the carriage is movable on a beam to carry the upper arm together with the marking device to a preselected position with respect to the objects to be marked". While Speicher discloses a marking device that is "movable in a plurality of directions in a horizontal plane, as well as vertically and rotationally about a vertical axis and also movable in a lifting operation through an arcuate path", the marking device is limited in travel to the mechanical limitations of the upper arm and carriage.

P. LaCanfora, Photoplotter, U.S. Pat. No. 4,003,061 (Jan. 11, 1977) discloses a photoplotter which includes "an image-projecting system movable with respect to a photosensitive material at relatively fast and efficient speeds and over relatively large areas. The photoplotter comprises a coherent fiber optic bundle for transmitting an image from the image-defining objects to the image-projecting system. The image can be moved over selective portions of the photosensitive material by moving the image-projecting system parallel to the material and rotated by rotating one end of the fiberoptic bundle". While LaCanfora discloses a movable and rotatable image-projecting system, the mechanical system is subject to the mechanical limits of the large and cumbersome image-projecting system components. As well, the plotter output image is easily obscured by the plotting components while the plotting operation proceeds.

J. McClean, N. Campbell, and I. Reid, Ultrasonic Scanning System, U.S. Pat. No. 4,881,177 (Nov. 14, 1989) disclose an ultrasonic scanning system for testing large curved components, with "water jet probes caliper-mounted on the working arm of an industrial robot". The "instantaneous probe position on the surface of the work piece is computed from data on the starting position of the scanning movement of the probe, and the scanning velocity of the probe". While the disclosed ultrasonic scanning system is movable in a plurality of directions with respect to the analysis of a given workpiece, the motion and extent of travel for the system is subject to the mechanical limitations of the working arm of the robot.

B. Wilkinson, System for Automatically Inspecting a Flat Workpiece for Holes, U.S. Pat. No. 4,711,579 (Dec. 5, 1987) discloses an inspection system for automatically documenting and verifying the position and dimensions of holes in a flat sheet metal workpiece which includes "a transparent, light diffusing inspection table upon which the workpiece is laid". "A ball screw-driven yoke travels continuously along the inspection table in the Y direction and includes a bottom bar for positioning a plurality of optical sensor arrays above the table. The optical sensor arrays are responsive to the presence (or absence) of light energy which is diffused by the table". Data is read and stored in a microcomputer for subsequent display and/or print out. "Circuitry is provided to multiplex the optical sensor arrays so that each pixel thereof is subsequently read in order to provide data corresponding to hole locations in the X direction across the table. The position of the yoke on the ball screw provides data corresponding to hole locations in the Y direction". While the disclosed automatic inspection system is movable in one direction with respect to the analysis of a given flat workpiece, the motion and extent of travel for the system is subject to the mechanical limitations of the ball-screw driven yoke and bottom bar.

P. Vachris, and T. Rodby, Portable "T"-Configured X-Y Plotter, U.S. Pat. No. 5,072,410 (Dec. 10, 1991) disclose a portable, X-Y plotter capable of plotting on any sized medium and work surface, which comprises "a generally T-configured instrument transport assembly for controllably imparting a dual (XY) axis translation to an instrument (e.g. plotting pen) across a workpiece (paper) and controllably engaging the plotting pen with the paper during its translation. A first translation arm extends in a first axial direction, and is supportable at its opposite ends on a work surface. A second translation arm, which forms a vertical leg of the T, is couple through a T-joint coupler to the first translation arm, so that the second translation arm extends in a second axial direction. A plotting pen is mounted on the second translation arm for translational movement in the second direction. A dual stepper motor unit in the T-joint coupler drives a rack and pinion for the first arm and a drive belt for the pen. While the disclosed portable "T" configured X-Y plotter is movable in two directions with respect to a medium and work surface, and can controllably engage a plotting pen with respect to a medium during the translation of the plotting pen holder, the motion and extent of travel for the plotter is subject to the mechanical limitations of the translation arms. As well, the plotter output image is easily obscured by the plotting components while the plotting operation proceeds.

C. Schantz, Ink Jet Printhead Electrical Connections, European Patent Application. 94306270.3 (filed Aug. 25, 1994) discloses a scanning head printer that includes a battery that is onboard a reciprocating printhead for providing power necessary for printing onto a medium. In a second embodiment, the drive signals for firing ink from the scanning printhead are transmitted in a wireless fashion. The scanning printhead can be free of restrictive cables that link the printhead to stationary circuitry. "A stationary primary coil may be employed for inductive coupling to a recharge coil that is mounted for movement with the printhead and the onboard battery, thereby permitting recharging of the battery when the printhead is in a rest position" . While the disclosed printhead electrical connections provide a printhead that uses onboard power for printing to a medium, and for receiving drive signals, the motion and extent of travel for the plotter is subject to the mechanical limitations of the translation arm that the printhead travels across. As in other prior art systems, the plotter output image is easily obscured by the plotting components while the plotting operation proceeds.

The disclosed prior art systems and methodologies thus provide basic plotting systems, but fail to provide a plotter print head that is independent of the mechanical limitations of a fixed two-dimensional device, and also fail to provide a plotter printhead that does not obscure the plotter output image while the plotting operation proceeds. The development of such a robotic plotting system would constitute a major technological advance.

SUMMARY OF THE INVENTION

A robotic plotting system 10 is provided, in which a robotic plotter 18 having a printhead is placed on a substantially flat horizontal surface 23 upon a recording medium 22, and is directed across the medium 22 by ranging signals 16 transmitted to the printhead 18 from the periphery of the recording medium 22. In one embodiment, the robotic printhead 18 includes a motorized drive mechanism 26, 28 that propels it across the surface of the recording medium 22 in a controlled manner, for example using microwave control signals 16. Thus, a user can place a piece of paper 22 of any size on a flat surface 23 such as a table or floor, and the printhead 18 is propelled across the surface 23 and is directed by signals 16 beamed between the printhead 18 and a control mechanism 14. In this manner, a large-surface-area plotting system 10 is provided in the form of a small hand-held device.

A remote transmitter 14, preferably an ultrasonic transmitter 14, located beyond the periphery of the print area 22, transmits a combined signal 16 having distinct frequencies that communicate printhead coordinate 64, 66 and pen activation 68 signals. A detection system 50 on the printhead 18 is used to receive the combined input signal 16 from the remote transmitter 14, isolate the printhead coordinate 64, 66 and pen activation 68 signals from each other, and process them independently to determine the desired location of the printhead 18 and of the position of the pointing tip 21 of the pen 20.

One alternative embodiment includes at least one printhead homing signal 102, wherein a portable plotter/printhead 18b can accurately update its current X and Y position with respect to the fixed location of the remote transmitter 14b or to separate pointer benchmarks, to more accurately produce an output image 25, particularly if the recording medium 22 is mounted on a non-uniform surface 23.

Another embodiment includes a "presentation" output signal 16, wherein the output signal 16 multiplexed to the plotter 18 for output to the medium 22 is synchronized with the order an input signal 127 is produced, such that the plotter can provide a "real-time" image 125 (e.g. following the handwriting of a person P on another surface 22, such as on a whiteboard, overhead projector, paper, or an electronic tablet and pointing device.

DETAILED DESCRIPTION OF PREFERRED EMBODIMENTS

Figure 1:
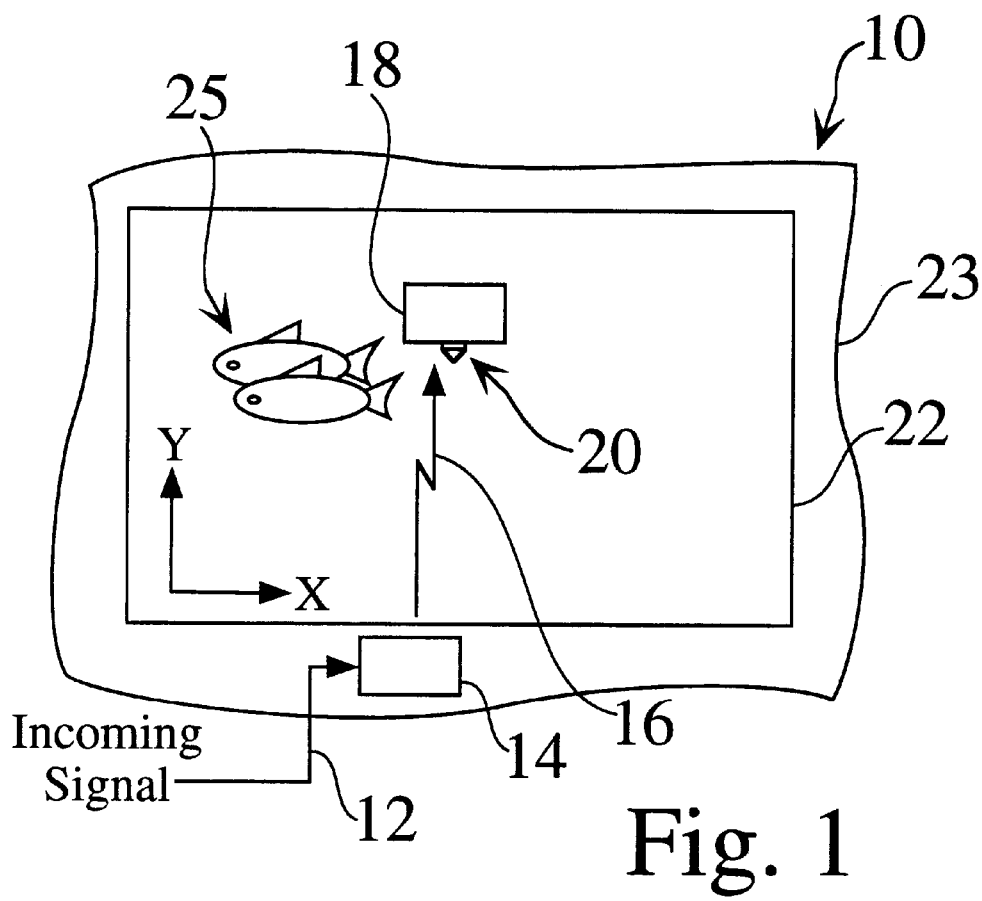
FIG. 1 is a top view of the robotic plotting system.

FIG. 1 is a top view of the robotic plotting system 10, in which a robotic plotter printhead 18 having a pen 20 is placed on a substantially flat horizontal surface 23 upon a recording medium 22. The robotic plotter printhead 18 is directed across the medium 22 by ranging signals 16, which are preferably infrared, ultrasound or microwave signals. The ranging signals 16 are transmitted to the printhead 18 from the periphery of the recording medium 22. The printhead 18 includes a motorized drive mechanism 26, 28 that propels it across the surface of the recording medium 22 in a controlled manner, for example using microwave control signals 16. Thus, a user can place a piece of paper 22 of any size on a flat surface 23 such as a table or floor, and the printhead 18 is propelled across the surface 23 and is directed by signals 16 beamed between the print head 18 and a control mechanism 14. In this manner, a large-surface-area plotting system 10 is provided in the form of a small hand-held device.

Figure 3:
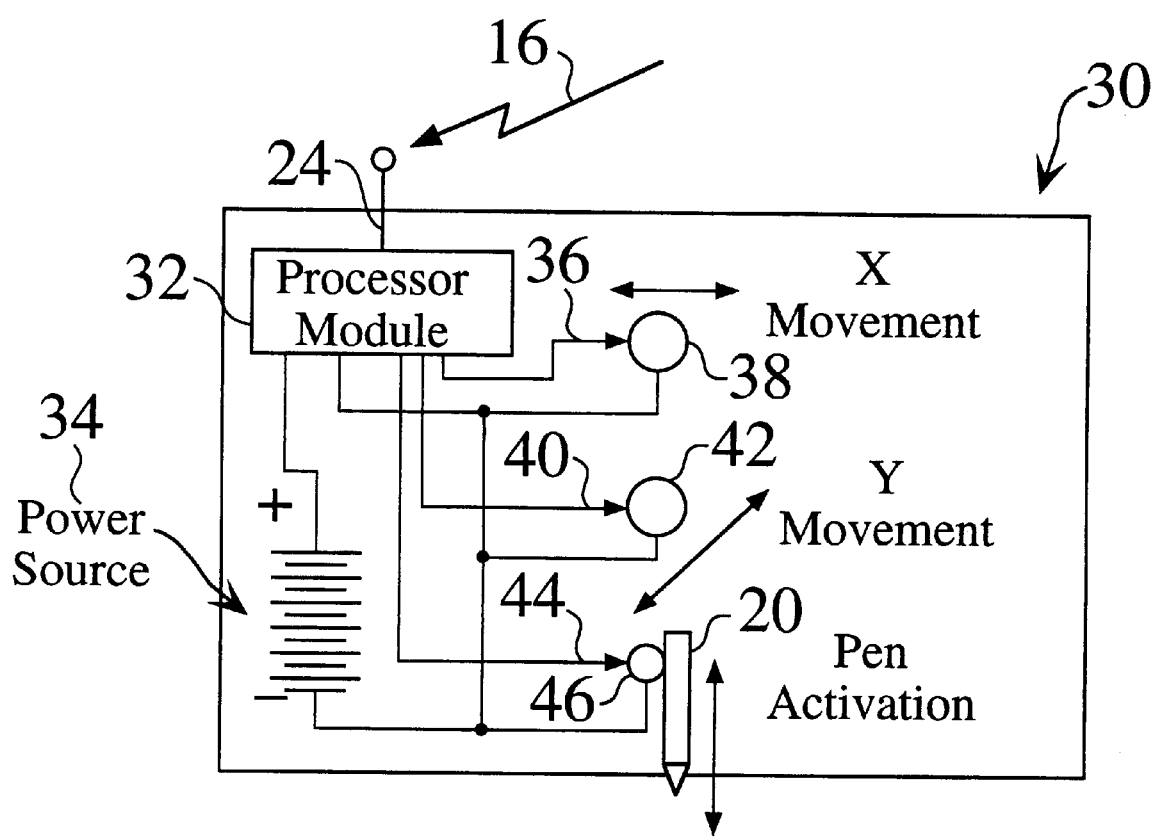
FIG. 3 is a functional block diagram 30 of a robotic plotter.
Figure 4:
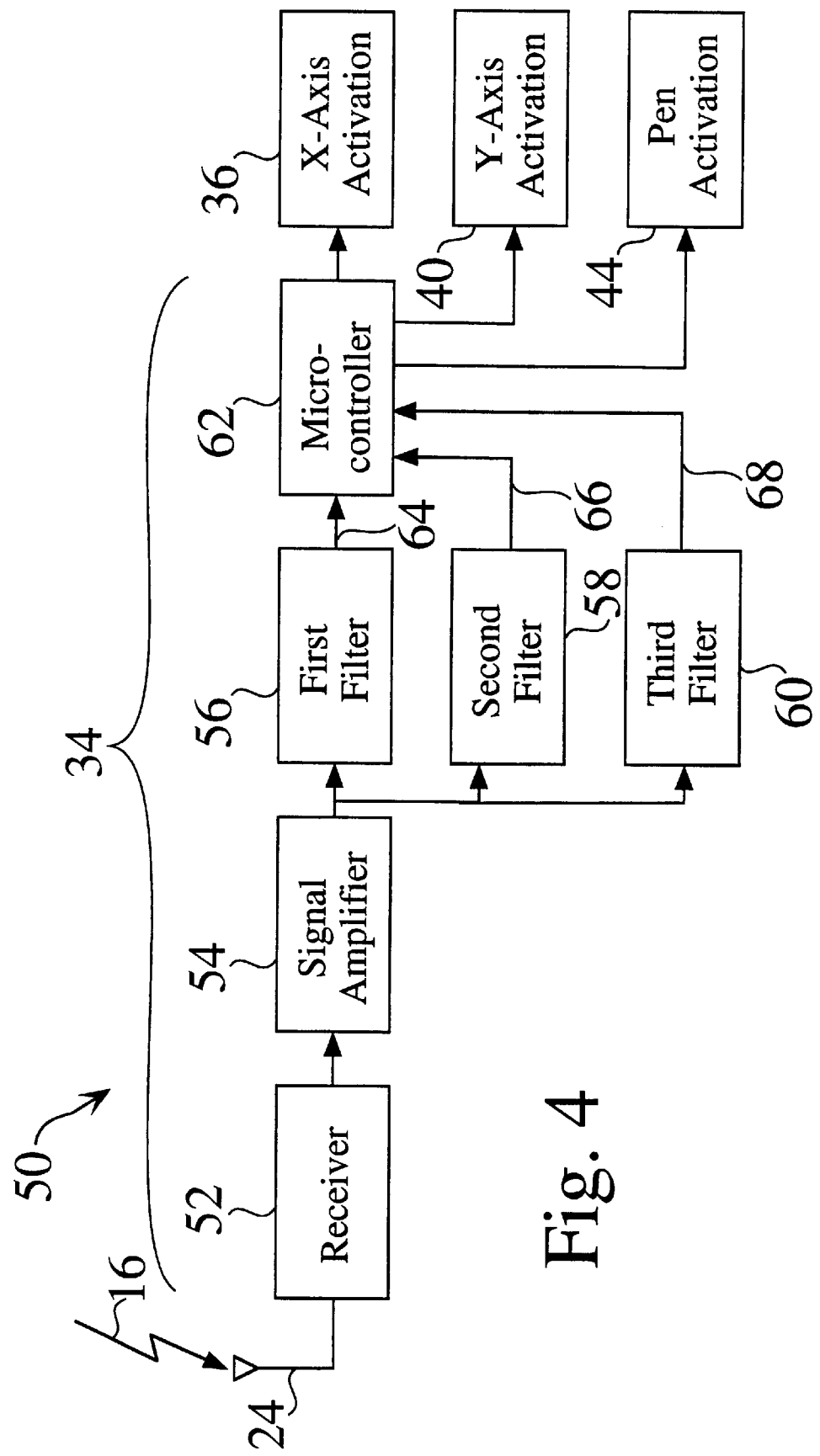
FIG. 4 is a flow chart which illustrates how the signal from a transmitter into a robotic plotter is processed.

A remote transmitter 14, preferably an ultrasonic transmitter 14, located beyond the periphery of the print area 22, transmits a combined signal 16 having distinct frequencies that communicate printhead coordinate 36, 40 and pen activation 44 signals (FIGS. 3, 4). A detection system 50 on the printhead 18 is used to receive the combined input signal 16 from the remote transmitter 14, isolate the printhead coordinate 64, 66 and pen activation 68 signals from each other, and process them independently to determine the desired location of the printhead 18 and of the position of the pointing tip 21 of the pen 20. Remote Plotting Process. The remote plotting process comprises the following steps:

i) inputting a plotter signal 16 to a robotic plotter printhead 18 having a pen tip 21;

ii) amplifying the input signal 16, if necessary;

iii) feeding the amplified signal 16 through a plurality of filters (56, 58, 60) to produce the desired X and Y location component signals (36, 40) and pen activation signal (44) for the robotic plotter printhead pen tip 21;

iv) selectively directing the robotic plotter 18 across a recording medium in response to the X and Y location components (36, 40); and v) selectively moving the pen tip 21 into contact with or away from the recording medium 22 in response to the pen activation signal (44).

Figure 2:
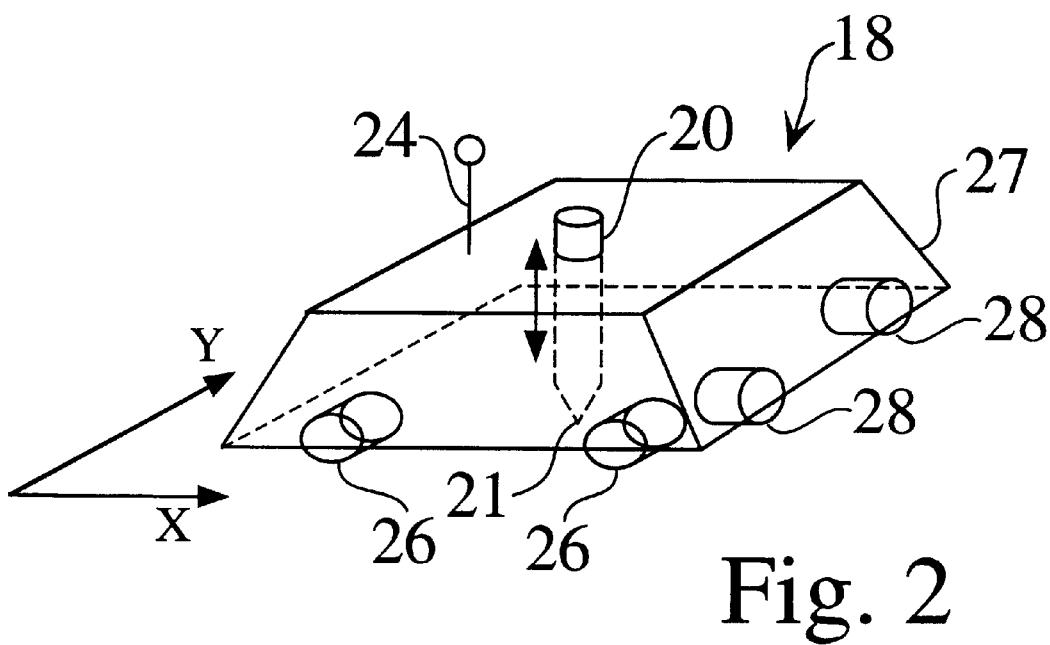
FIG. 2 is a perspective view of a robotic plotter, having means for moving in a plurality of directions X, Y across a recording medium, and a pen that is selectively activatible to come into contact with the recording medium.

FIG. 2 is a perspective view of a robotic plotter printhead 18, having means for moving 26, 28 in a plurality of directions X, Y across a recording medium 22, and a pen 20 that is selectively activatible to come into contact with the recording medium 22. The means for moving 26, 28 in a plurality of directions X, Y can be either separate drives that each move the robotic plotter printhead 18 in either the X or Y direction, or can be a single drive means that can selectively move in any direction across the X-Y plane upon the recording medium 22.

The pen 20 has a pointing tip 21, which comes into contact with a recording medium 22 when the pen 20 is in the "pen down" position, and is moved away from contacting the recording medium 22 when the pen 20 is in the "pen up" position. While FIG. 2 shows only one pen 20, alternate printheads 18 hold multiple pens 20 and activation devices 46 simultaneously. Multiple pens 20 are used to plot images 25 having multiple colors, or are used to plot images having different line widths. In other embodiments, one or more inkjet pens 20 are used, wherein the activation device 46 is used to selectively activate the pens 20 to spray ink or toner.

The robotic plotter printhead 18 has an outer housing 27 that contains the pen 20, the means for moving 26,28, the internal electronics (discussed below), and the receiver antenna 24, which is used to receive input signals 16.

Figure 12:
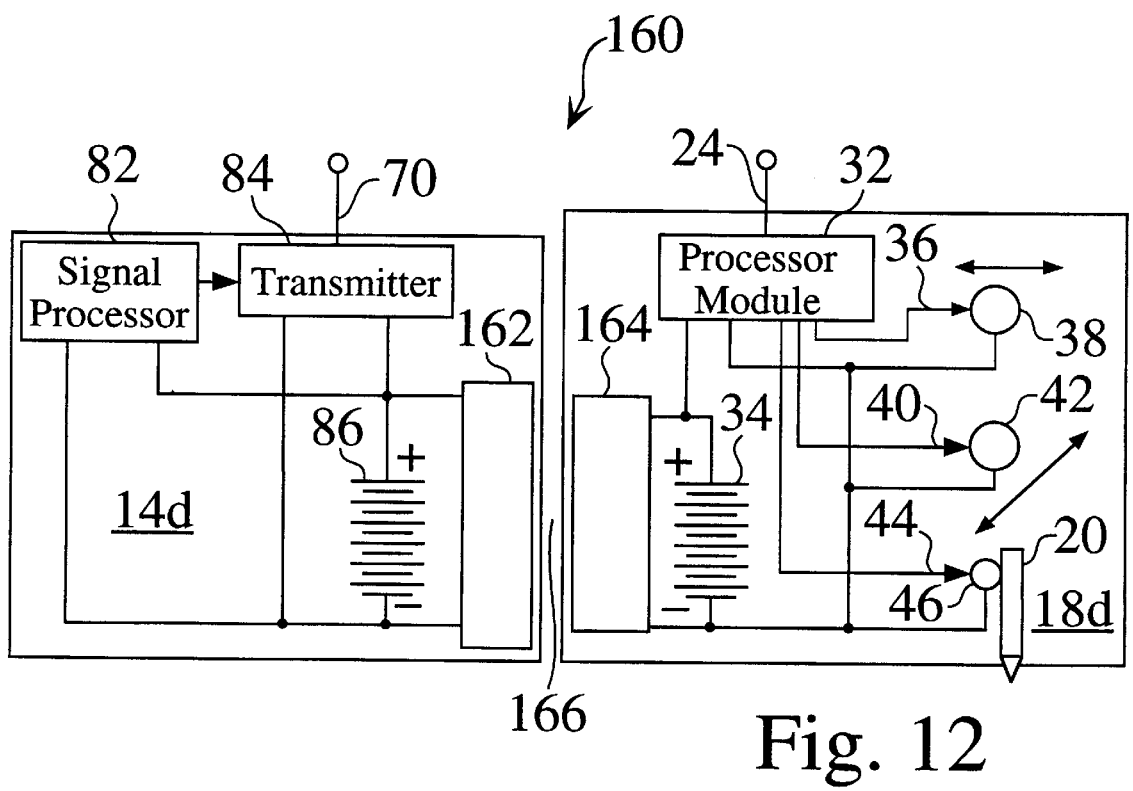
FIG. 12 is a functional block diagram showing inductive coupling between a plotter transmitter module and a robotic plotter printhead.

FIG. 3 is a functional block diagram 30 of a robotic plotter printhead 18. The printhead 18 can be powered from a number of sources 34, including but not limited to replaceable batteries, rechargeable batteries, or solar cells. In one alternate embodiment 160, as shown in FIG. 12, a stationary primary coil 162 is included in the plotter transmitter module 14d. The stationary primary coil 162 provides power, through inductive coupling 166, to a recharge coil 164 located within the robotic plotter printhead 18d, when the robotic plotter printhead 18d is stored in a home position next to the plotter transmitter module 14d. The recharge coil 164 is connected to the rechargeable battery power source 34 within the robotic plotter printhead 18.

Input signals 16 enter the processor module 32 through the receiver antenna 24. The processor module 32 includes both signal receiving and processing capabilities, as shown in FIG. 4. Supply power for controlled movement in the X direction 36 is fed to a stepper motor 38 which is used to activate rollers 26 that guide the robotic plotter printhead 18 in the X direction. Supply power for controlled movement in the Y direction 40 is fed to a stepper motor 42 which is used to activate rollers 28 that guide the robotic plotter printhead 18 in the Y direction. As discussed above, a single drive system 26 can be used, having a drive motor and a means for selectively directing the robotic plotter printhead 18 in any direction across the X-Y plane of the recording medium.

Supply power is fed to an activation device 46, for the controlled activation 44 of the pen between a "pen up" position and a "pen down" position, which moves the pen tip 21 into contact with or away from an output medium 22.

FIG. 4 is a flow chart of the detection system 50, which illustrates how the ranging input signal 16 from a plotter transmitter module 14 into a robotic plotter printhead 18 is processed. An incoming signal 16 enters the receiver 52 through the receiver antenna 24, and is amplified by the signal amplifier 54.

The input signal 16, contains signals of distinct frequencies, which communicates X information, Y information, and pen activation information simultaneously. The detection system 50 isolates the input signals 64, 66 and 68 from each other, using bandwidth filters 56, 58 and 60, and processes them independently, within a microcontroller 62. The microcontroller 62 selectively and simultaneously produces activation signals 36, 40 and 44 to control the movement of the robotic plotter printhead 18 in the X and Y direction, and the activation of the pen 20, upon the surface of a recording medium 22.

Figure 5:
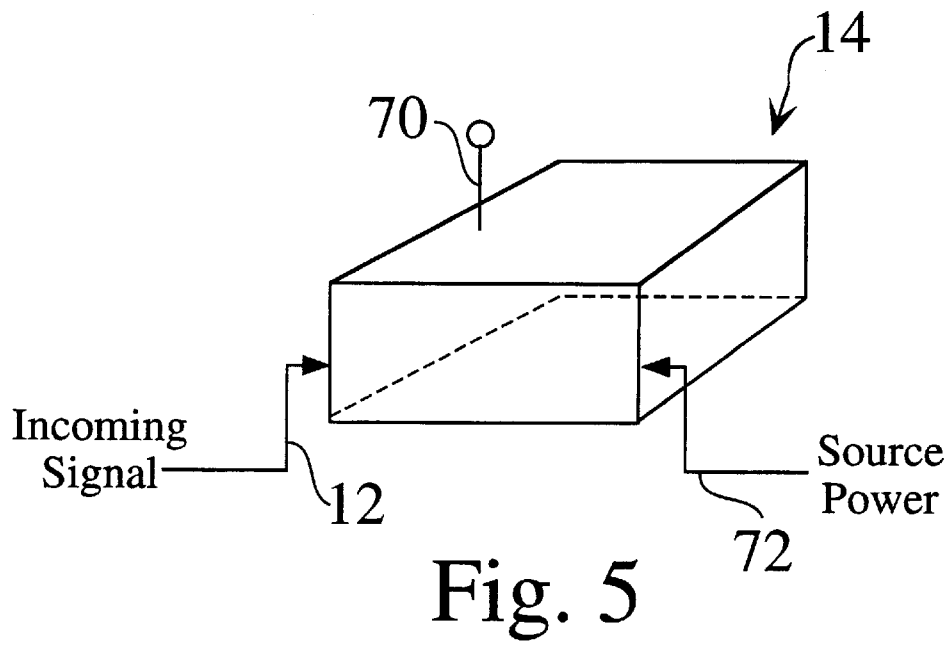
FIG. 5 is a perspective view of a plotter transmitter module.
Figure 6:
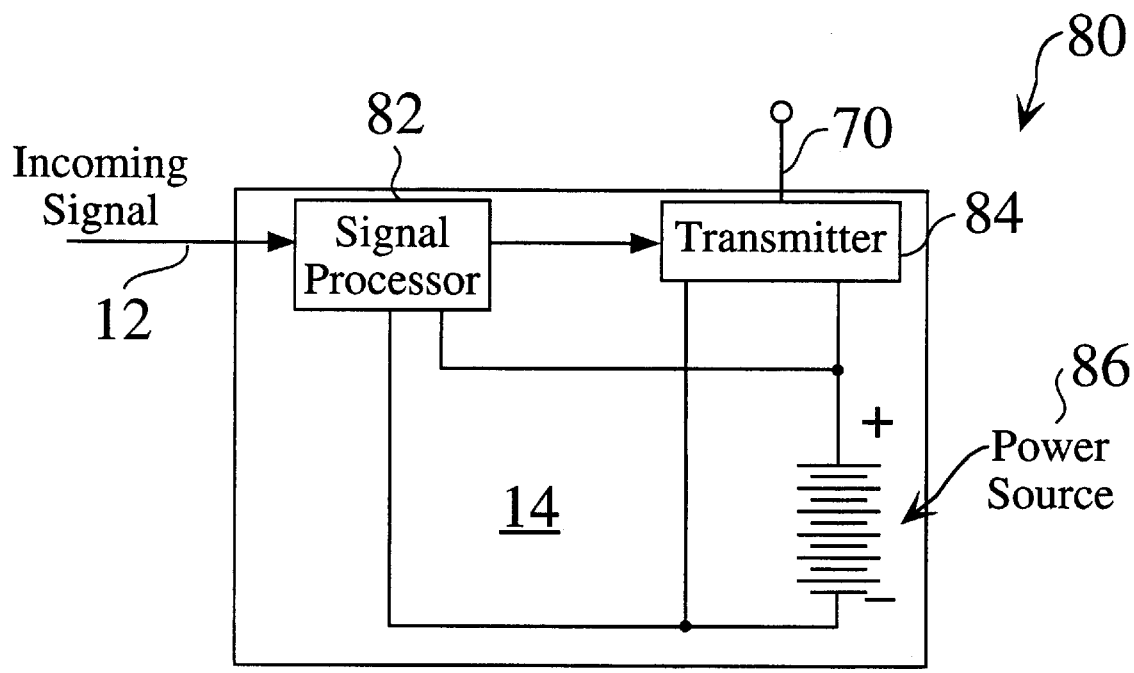
FIG. 6 is a functional block diagram of a plotter transmitter module.
Figure 7:
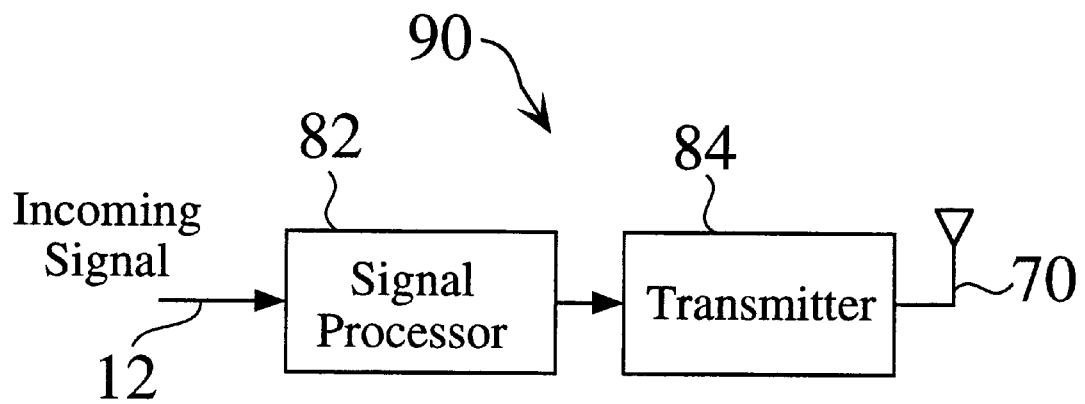
FIG. 7 is a functional block diagram of a plotter transmitter module.

FIG. 5 is a perspective view of a plotter transmitter module 14, which is typically located on the periphery of a recording medium 22, and transmits signals 16 to the robotic plotter printhead 18. FIG. 6 is a functional block diagram 80 of the plotter transmitter. FIG. 7 is a functional block diagram 90 of the plotter transmitter module 14. An incoming image signal 12, typically a digital signal, is fed to a signal processor 82, which produces a composite signal that contains the information necessary for the robotic plotter printhead 18 to draw an image 25 upon a recording medium 22. A plotter transmitter 84 transmits the signal 1 6, through a transmitter antenna 70. The plotter transmitter module 14 can be powered by external power 72, or by an internal power source 86.

Figure 8:
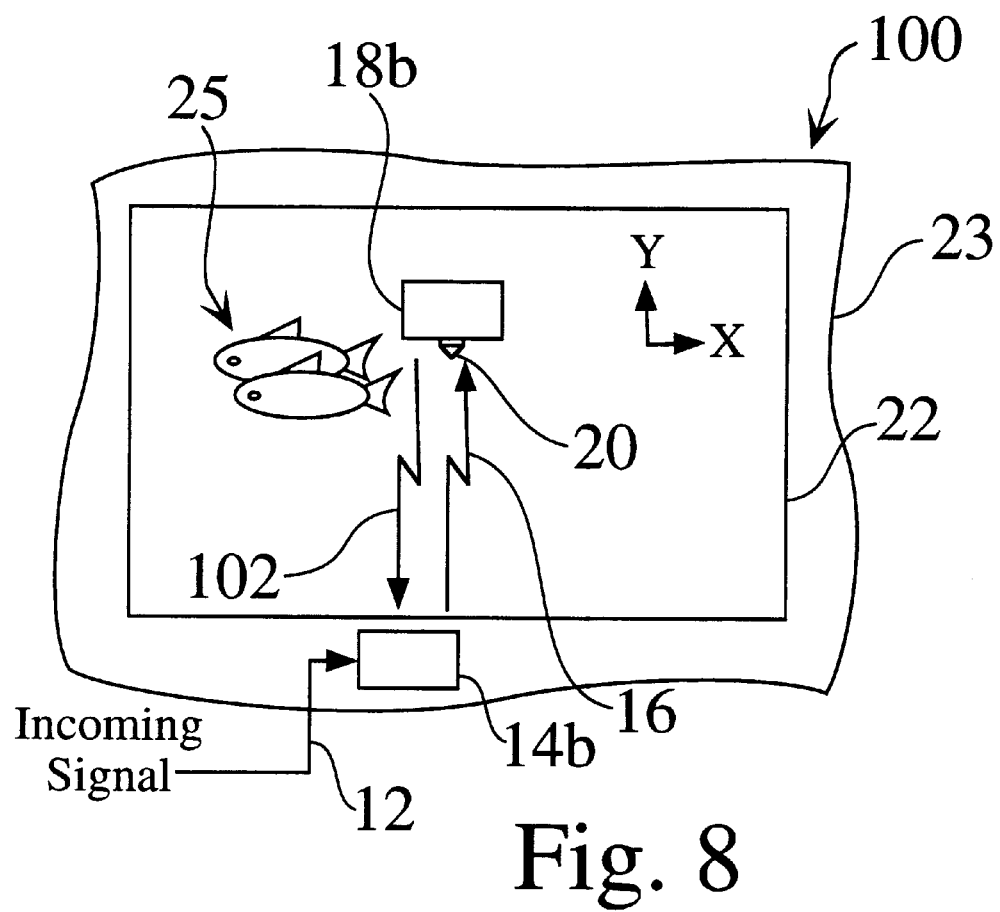
FIG. 8 is a top view of an alternate robotic plotting system having a printhead position signal.
Figure 9:
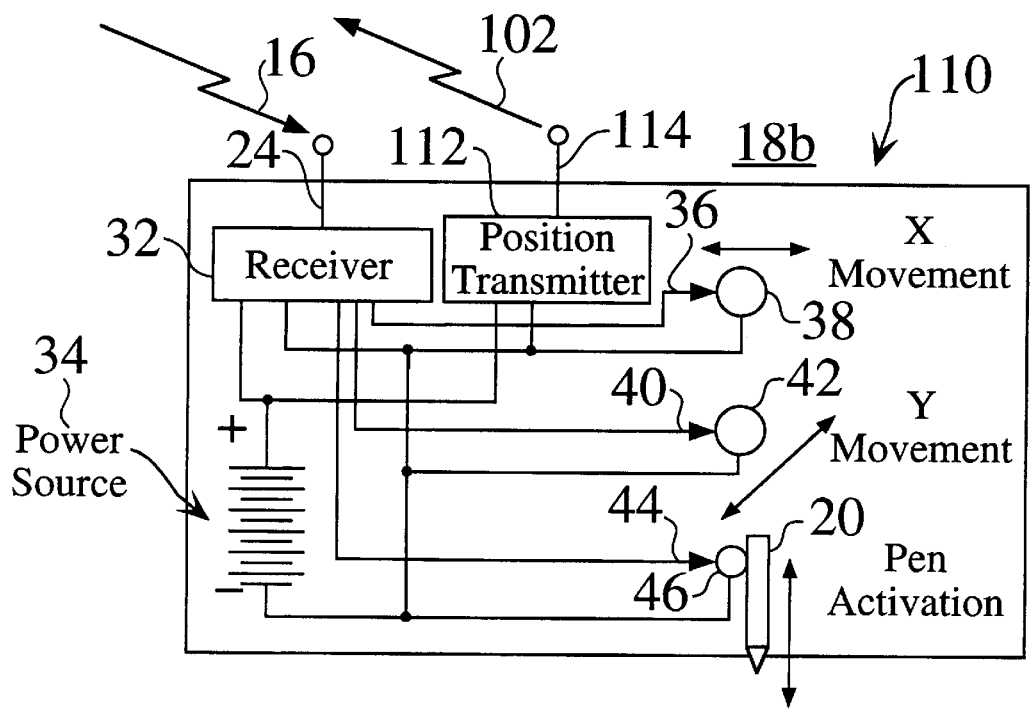
FIG. 9 is a functional block diagram of a robotic plotter having a printhead position transmitter.

Alternate Embodiments. FIG. 8 is a top view of an alternate robotic plotting system 100 having a printhead position signal 102, to more accurately produce an output image 25, particularly if the recording medium 22 is mounted on a non-uniform surface 23. FIG. 9 is a functional block diagram 110 of a robotic plotter 18b having a printhead position transmitter 112. In this embodiment, the portable plotter/printhead 18b accurately transmits its current location back to the remote transmitter 14b, by communicating either its X and Y position, or its distance and angle, with respect to the fixed location of the remote transmitter 14b. A similar alternate embodiment uses one or more separate pointer benchmarks, wherein the portable plotter/printhead 18b bounces a printhead position signal 102 off the pointer benchmarks, to confirm its own current position, and adjust its plotter output accordingly to accurately produce an output image 25.

Figure 10:
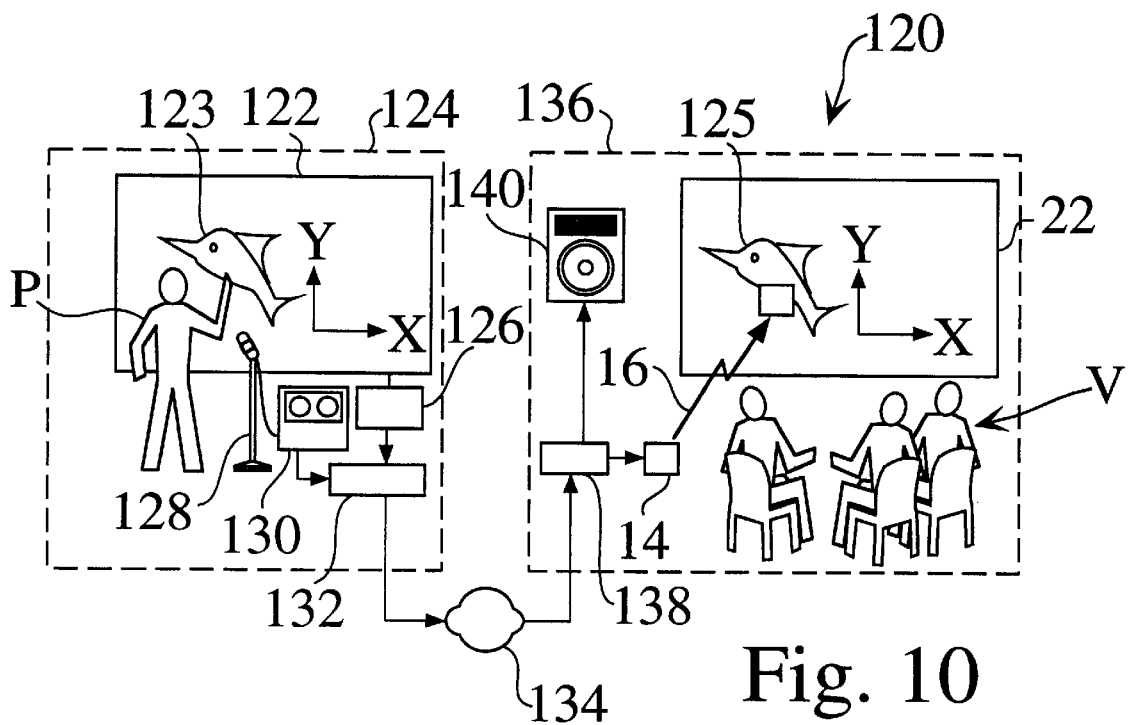
FIG. 10 is a view of a real-time display robotic plotting system.

FIG. 10 is a view of a real-time display robotic plotting system 120, which includes a "presentation" output signal 127 at a first site 124, wherein the output signal 16 multiplexed to the plotter 18 for output to the medium 22 is time-synchronized to the presentation output signal 127, such that the plotter 18 can provide a "real-time" presentation of an image 125 at a second site 136 (e.g. following the handwriting of a person P on another surface 122, such as on a whiteboard, overhead projector, paper, or an electronic tablet and pointing device). In this embodiment, a presentation signal processor 126 uses a software algorithm to convert an entered image 123 on an electronic presentation whiteboard 122 to a digital image signal 127. The digital image signal 127 may be also combined with a sound signal 131 from a microphone 128 and recorder 130 in a presentation signal transmission device 132, before being transmitted, through a network 134, to a second site 136.

The incoming signal enters presentation signal reception device 138, which splits the image signal 12 from an optional sound signal, and sends the image signal 12, typically a digital signal, to the plotter transmitter module 14, and sends the optional sound signal, which is typically an analog signal, to a speaker 140.

Figure 11:
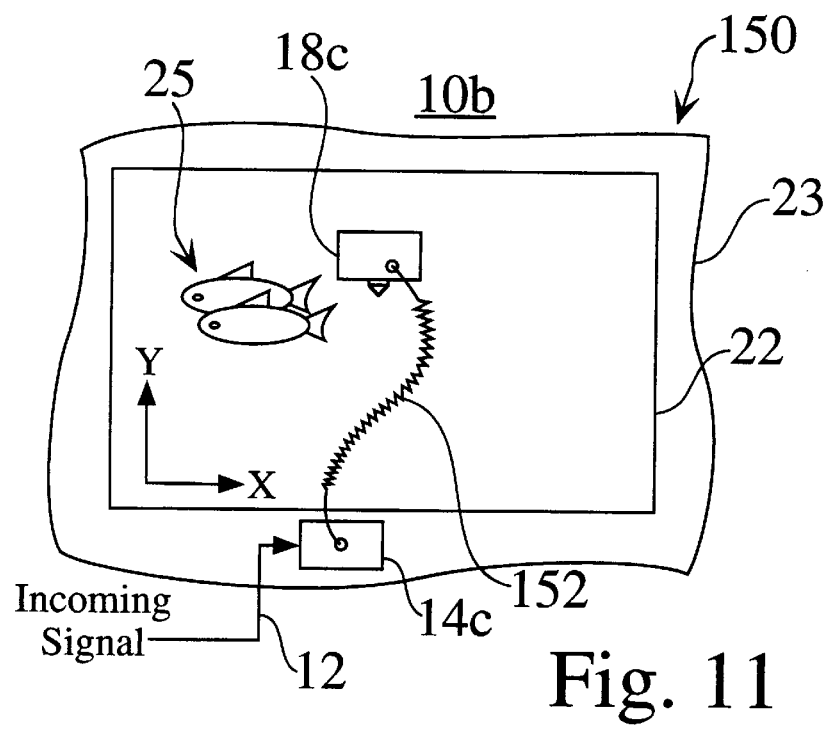
FIG. 11 is a top view of an alternate robotic plotting system having a flexible signal and power lead.

FIG. 11 is a top view of an alternate robotic plotting system 150 having a flexible signal and power lead 152, which is tethered between the plotter transmitter module 14c and the portable printhead 18c. Power, input signals 12, and location signals 102 can be extended between the portable printhead 18c and the plotter transmitter module 14c by a plurality of flexible conductive wires, which make up the flexible signal and power lead 152. In this embodiment 150, the portable printhead 18c can still be used to print to a large variety of mediums having different dimensions, while eliminating the portable power source and reducing the signal processing complexity of transmitting, receiving and process signals between the plotter transmitter module 14c and the portable printhead 18c.

Figure 13:
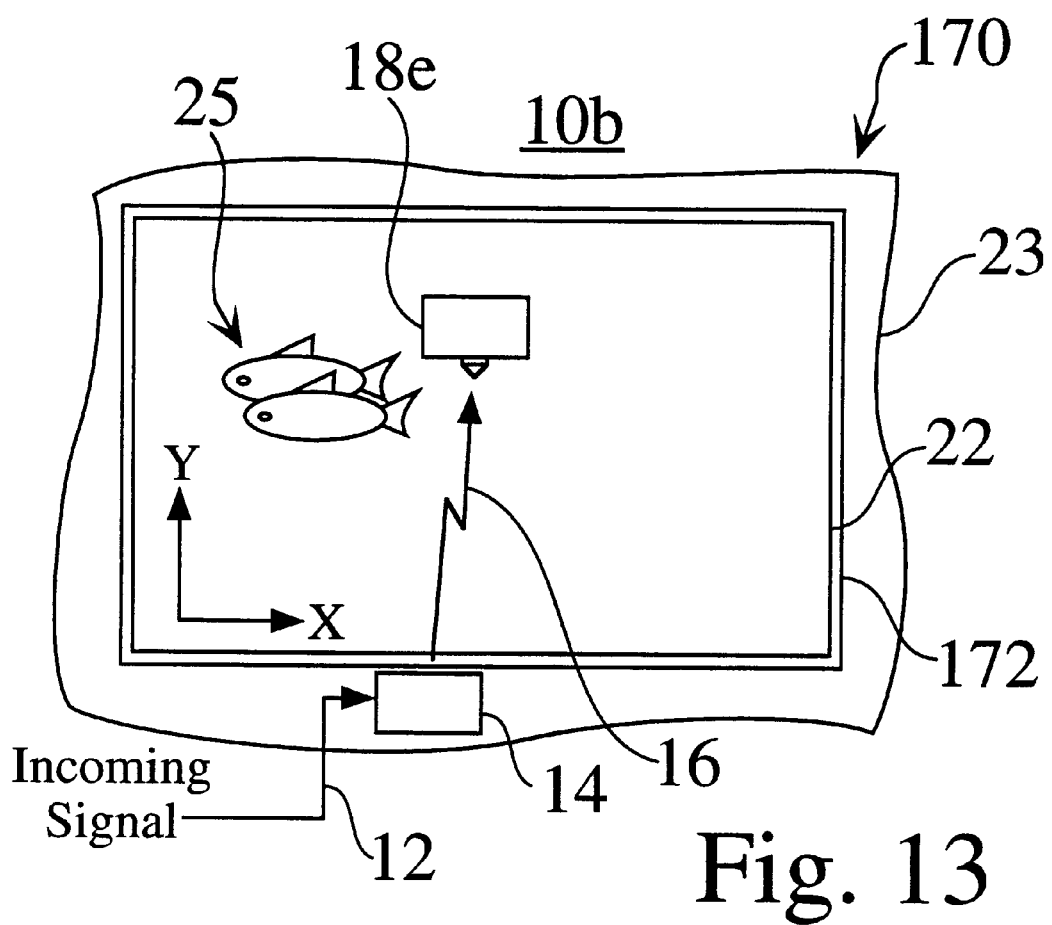
FIG. 13 is a top view of an alternate robotic plotting system having a plotter printhead surface attachment layer.

FIG. 13 is a top view of an alternate robotic plotting system 170 having a plotter printhead surface attachment layer 172. When it is desired to place a recording medium 22, such as paper or a whiteboard, on a vertical or highly inclined surface 23, in some embodiments it may be useful to include a means for attaching a plotter printhead to the recording medium 22 and the surface 23 such as through electrostatic or magnetic coupling. In FIG. 13, a magnetic attachment layer 172 is placed between the recording medium and a surface. The robotic plotter printhead includes an attachment magnet to confine movement of the plotter printhead 18e to the recording surface 22. In some embodiments, a separate attachment layer 172 is not necessary.

System Advantages. The robotic plotter system 10 provides many advantages over prior plotting systems. The use of the a portable, wireless printhead 18 allows the system 10 to display or print large formats economically, without a fixed carriage to provide a means for the mechanical displacement of the printhead in a plurality of directions. The robotic plotter system 10 can print or display onto a variety of mediums, using different pen or ink jet tips 21, and easily produces large format images economically. The robotic plotter system 10 also has the ability to display an image 25 without obscuring the image 25 while it is being drawn, since the portable printhead 18 is not attached to complex axial arms or locating bars.

Although the robotic plotting system and its methods of use are described herein in connection with plotting onto a recording medium, the apparatus techniques can be implemented for other input or output display devices, or any combination thereof, as desired.

Accordingly, although the invention has been described in detail with reference to a particular preferred embodiment, persons possessing ordinary skill in the art to which this invention pertains will appreciate that various modifications and enhancements may be made without departing from the spirit and scope of the claims that follow.

What is claimed is:

1. A robotic plotting printhead for receiving a combined input signal from a first transmitting element, said combined input signal having a plurality of distinct frequencies which communicate a printhead coordinate input signal and a pen activation input signal, and for printing onto a recording medium, said recording medium located on a first surface, comprising:

a receiver element adapted to receive said combined input signal from said first transmitting element;

a detection system having a plurality of bandwidth filters for receiving said combined signal from said receiver element and for isolating said printhead coordinate input signal and said pen activation input signal through said plurality of bandwidth filters;

a microcontroller for independently processing said isolated printhead coordinate input signal and said pen activation input signal to selectively and simultaneously produce a printhead coordinate activation signal and a pen activation signal;

a motorized drive system connected to said microcontroller and directed by said printhead coordinate activation signal for propelling said robotic plotting printhead across said recording medium in a controlled manner; and an activatable pen tip activated by said pen activation signal through said microcontroller for writing onto said recording medium.

2. The robotic plotting printhead of claim 1, wherein said first surface is substantially planar.

3. The robotic plotting printhead of claim 1, wherein said first transmitting element is located along the periphery of said recording medium.

4. The robotic plotting printhead of claim 1, wherein said combined signal is a microwave control signal.

5. The robotic plotting printhead of claim 1, wherein said combined signal is an ultrasonic control signal.

6. The robotic plotting printhead of claim 1, wherein said combined signal is an infrared control signal.

7. The robotic plotting printhead of claim 1, further comprising:

a printhead transmitter element adapted to transmit a homing signal to said first transmitting element.

8. The robotic plotting printhead of claim 1, further comprising:

a printhead transmitter element adapted to transmit a homing signal to a pointer benchmark.

9. The robotic plotting printhead of claim 1, further comprising:

a portable power source connected to said receiver element, said detection system, said motorized drive system, and said activatable pen tip.

10. The robotic plotting printhead of claim 1, further comprising:

a flexible power lead tethered between said robotic plotting printhead and said first transmitting element.

11. A robotic plotting system, comprising:

a first surface adapted to produce a time-synchronized presentation output signal in response to a written image entered by a user at a first site;

a network adapted to send said presentation output signal from said first site to a second site;

a plotter transmitter module at said second site adapted to receive said presentation output signal and also adapted to transmit a combined input signal having a plurality of distinct frequencies which communicate a printhead coordinate input signal and a pen activation input signal in response to said received presentation output signal; and a plotter printhead at said second site having a receiver element adapted to receive said combined signal from said plotter transmitter module, a detection system having a plurality of bandwidth filters, for receiving said combined signal from said receiver element and for isolating said printhead coordinate signal and said pen activation signal through said plurality of bandwidth filters, a motorized drive system directed by said printhead coordinate signal through said receiver element for propelling said robotic plotter printhead across a recording medium in a controlled manner, and a pen tip activated by said pen activation signal through said receiver element for writing onto said recording medium.

12. The robotic plotting system of claim 11, further comprising:

a sound recording system adapted to produce a sound output signal in response to sounds entered by a user at said first site, wherein said network is adapted to send both said presentation output signal and said sound output signal from said first site to said second site; and a sound presentation system at said second site adapted to receive said sound output signal from said first site, and present said sound signal at said second site.

13. The robotic plotting system of claim 11, wherein said plotter transmitter module is located along the periphery of said recording medium.

14. The robotic plotting system of claim 11, wherein said combined signal is a microwave control signal.

15. The robotic plotting system of claim 11, wherein said combined signal is an ultrasonic control signal.

16. The robotic plotting system of claim 11, wherein said combined signal is an infrared control signal.

17. A process, comprising the steps of:

inputting a combined plotter signal to a remote plotter printhead having a pen tip, said combined plotter signal having a plurality of distinct frequencies which separately communicate X and Y location coordinate input signals and a pen activation input signal in response to said received presentation output signal;

feeding said combined plotter signal through a plurality of filters to isolate said X and Y location component input signals and said pen activation input signal;

independently processing said X and Y location component input signals and said pen activation input signal to selectively and simultaneously produce X and Y location component activation signals and a pen activation signal;

selectively directing said remote plotter printhead across a recording medium in response to said independently processed X and Y location component activation signals; and selectively moving said pen tip into contact with or away from said recording medium in response to said independently processed pen activation signal.

18. The process of claim 17, further comprising the step of:

amplifying said input combined plotter signal.

19. The process of claim 17, wherein said combined plotter signal is an ultrasonic signal.

20. The process of claim 17, wherein said combined plotter signal is an infrared signal.

* * * * *